United States Patent
Sharma et al.

(10) Patent No.: US 10,129,878 B2
(45) Date of Patent: Nov. 13, 2018

(54) SYSTEMS AND METHODS FOR DYNAMIC BAND SWITCHING

(71) Applicant: QUALCOMM Incorporated, San Diego, CA (US)

(72) Inventors: Ravi Kumar Sharma, Hyderabad (IN); Komal Kumar Seelam, Hyderabad (IN); Nirav Nayan Shah, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 14/611,317

(22) Filed: Feb. 2, 2015

(65) Prior Publication Data

US 2016/0227535 A1 Aug. 4, 2016

(51) Int. Cl.
*H04W 72/04* (2009.01)
*H04W 72/12* (2009.01)
*H04W 88/06* (2009.01)

(52) U.S. Cl.
CPC ... *H04W 72/0453* (2013.01); *H04W 72/1215* (2013.01); *H04W 88/06* (2013.01)

(58) Field of Classification Search
CPC . H04W 72/0453; H04W 72/04; H04W 88/06; H04W 72/1215
See application file for complete search history.

(56) References Cited

U.S. PATENT DOCUMENTS

| | | | |
|---|---|---|---|
| 7,941,177 B2 | 5/2011 | Kim | |
| 8,126,502 B2 | 2/2012 | Trainin | |
| 8,274,903 B2 * | 9/2012 | Wentink | H04W 36/06 370/248 |
| 8,850,204 B2 * | 9/2014 | Stacey | H04L 9/06 380/28 |
| 9,386,496 B2 * | 7/2016 | Gupta | H04W 36/22 |
| 9,433,003 B2 * | 8/2016 | Wietfeldt | H04W 16/14 |
| 9,839,006 B1 * | 12/2017 | Zakaria | H04W 72/04 |
| 2008/0176568 A1 | 7/2008 | Palanki et al. | |
| 2008/0298450 A1 * | 12/2008 | Zhang | H04L 1/0006 375/227 |
| 2008/0320354 A1 * | 12/2008 | Doppler | H04L 1/04 714/748 |
| 2011/0261735 A1 | 10/2011 | Cordeiro | |
| 2012/0182976 A1 | 7/2012 | Thoukydides et al. | |

(Continued)

OTHER PUBLICATIONS

International Search Report and Written Opinion—PCT/US2015/066366—ISA/EPO—dated Mar. 15, 2016.

*Primary Examiner* — Asad M Nawaz
*Assistant Examiner* — Thomas R Cairns
(74) *Attorney, Agent, or Firm* — Paradice and Li LLP/Qualcomm (57) ABSTRACT

Systems and methods for dynamically switching between frequency bands as a result of a detected condition that has the potential to degrade performance on the current band of operation. An access point having the capability to operate on multiple bands provides information necessary to form a communication link on a different band of operation, such as the channel of operation and any security credentials. Accordingly, a device that is associated with the access point on one frequency band may first receive the alternate band switching information and subsequently dynamically switch to a different band of operation using the alternate band information.

11 Claims, 5 Drawing Sheets

(56) References Cited

U.S. PATENT DOCUMENTS

| | | |
|---|---|---|
| 2012/0300759 A1 | 11/2012 | Patanapongpibul et al. |
| 2013/0155991 A1* | 6/2013 | Kazmi .............. H04W 72/0453 370/329 |
| 2014/0269468 A1 | 9/2014 | Jia et al. |

* cited by examiner

SYSTEMS AND METHODS FOR DYNAMIC BAND SWITCHING

FIELD OF THE PRESENT DISCLOSURE

This disclosure generally relates to wireless communication systems and more specifically to systems and methods for facilitating gathering information about available wireless networks.

BACKGROUND

Wireless local area networks (WLANs) conforming to specifications in the Institute of Electrical and Electronics Engineers ("IEEE") 802.11 family typically involve a basic service set (BSS) managed by a device acting in the role of an access point (AP). Each BSS may be identified by a service set identifier (SSID), such that a wireless communications device, or station (STA) using a WLAN protocol may receive broadcast messages or beacons from access points within range advertising the SSID of their associated networks. Stations may also form wireless links directly with each other in peer-to-peer or ad hoc topologies in which WLAN devices may discover each other and share data traffic directly, without the instance of a traditional access point. This type of network configuration may be known as an independent basic service set (IBSS). One example of a peer-to-peer network is a Wireless Fidelity (WiFi) Direct™ network. As IBSS networks typically do not have a distribution system or other dedicated device to control the network, one peer may undertake certain management functions by acting in the role of peer-to-peer group owner (P2P GO) and one or more additional devices may associate with the GO as P2P clients. In other situations, one wireless device may assume one or more roles associated with access point functionality, acting as a software-enabled access point (SAP).

As a consequence of the increase in popularity of WLAN technologies, congestion for operations on the 2.4 GHz band has increased. This situation is exacerbated given that the 2.4 GHz band is part of the Industrial, Science and Medical radio band allocated by the FCC for a wide range of wireless technologies, including Bluetooth. Although WLAN communications operate on an asynchronous protocol and access the wireless medium using Carrier Sense Multiple Access/Collision Avoidance (CSMA/CA) mechanisms while Bluetooth communications rely on time division multiplex access (TDMA) mechanisms, sharing the 2.4 GHz band may still result in interference between the two communications systems. This problem is exacerbated by the physical collocation of the systems when both are implemented in a single device. Indeed, current trends are moving from each system being carried on separate integrated circuits to merging both onto a single chip in system on a chip (SoC) designs. As a result, there is a trend to provide devices with the capability to operate on different bands, such as the 5 GHz band, to avoid congestion and potentially benefit from increased performance. Correspondingly, a wireless communications device may be able to operate on a plurality of bands, such as the 2.4 GHz band, the 5 GHz band or others, as noted. However, when wireless communications devices associate with each other, the link may still be formed on one band, such as the 2.4 GHz band, by default or by chance. This may cause performance degradation when WLAN operation of the device experiences interference with another wireless technology, such as Bluetooth. Performance degradation may also result from congestion on the selected band or from other conditions that differentially affect only some of the available bands of operation.

Accordingly, it would be desirable to provide a wireless communications device that may select among bands of operation to enhance performance. Similarly, it would be desirable to exchange information regarding operation on different frequency bands. As will be appreciated from the material that follow, this disclosure satisfies these and other goals.

SUMMARY

This specification discloses a wireless communication device having a first transceiver for communicating with a first network node over a first frequency band and a second transceiver for communicating with the first network node over a second frequency band and a band manager to process alternate band information, wherein the alternate band information is communicated using the first transceiver and enables communication with the first network node over the second frequency band. As desired, the alternate band information enables communication over the second frequency band without additional handshake exchanges.

In one aspect, the band manager may process alternate band information by transmitting the alternate band information to the first network node.

In one aspect, the band manager may process alternate band information by receiving the alternate band information from the first network node. The band manager may also communicate with the first network node by switching from using the first transceiver to using the second transceiver based at least in part on a defined criterion. Further, the wireless communications device may include a Bluetooth module and the defined criterion may be an operational status of the Bluetooth module. In one embodiment, the first frequency band may be a 2.4 GHz band and the second frequency band may be a 5 GHz band.

This disclosure is also directed to a method for communication with a wireless communication device that includes providing a wireless communications device having a first transceiver configured to communicate with a first network node over a first frequency band and a second transceiver configured to communicate with the first network node over a second frequency band and processing alternate band information, wherein the alternate band information is communicated using the first transceiver and enables communication with the first network node over the second frequency band. As desired, the alternate band information enables communication over the second frequency band without additional handshake exchanges.

In one aspect, processing alternate band information may include transmitting the alternate band information to the first network node.

In one aspect, processing alternate band information may include receiving the alternate band information from the first network node. The method may also include communicating with the first network node by switching from using the first transceiver to using the second transceiver based at least in part on a defined criterion. The defined criterion may be an operational status of a Bluetooth module collocated with the first transceiver. In one embodiment, the first frequency band may be a 2.4 GHz band and the second frequency band may be a 5 GHz band.

This disclosure also includes a non-transitory processor-readable storage medium for operating a wireless communications device having a first transceiver configured to communicate with a first network node over a first frequency band and a second transceiver configured to communicate with the first network node over a second frequency band, the processor-readable storage medium having instructions thereon, such that the instructions may comprise code for processing alternate band information, wherein the alternate band information is communicated using the first transceiver and enables communication with the first network node over the second frequency band. As desired, the alternate band information may enable communication over the second frequency band without additional handshake exchanges.

In one aspect, the instructions may be configured to process alternate band information by transmitting the alternate band information to the first network node.

In one aspect, the instructions may be configured to process alternate band information by receiving the alternate band information from the first network node. The instructions may also include code for communicating with the first network node by switching from using the first transceiver to using the second transceiver based at least in part on a defined criterion. The defined criterion may be an operational status of a Bluetooth module collocated with the first transceiver.

BRIEF DESCRIPTION OF THE DRAWINGS

Further features and advantages will become apparent from the following and more particular description of the embodiments, as illustrated in the accompanying drawings, and in which like referenced characters generally refer to the same parts or elements throughout the views, and in which.

DETAILED DESCRIPTION OF THE INVENTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments that may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system.

Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network.

Further, embodiments are discussed in specific reference to wireless networks. As such, this disclosure is applicable to any suitable wireless communication systems having the necessary characteristics. For example, one of skill in the art will recognize that these techniques may be applied when the access point functionality is embedded in other devices of an information handling system such as, for example, routers, switches, servers, computers, or the like, and the designation as an AP is not limited to dedicated access point devices. Further, in addition to infrastructure WLAN topologies, the techniques of this disclosure may be applied to other network configurations, such as the ad hoc or peer-to-peer topologies discussed above, or to other wireless communication systems or other wireless protocols involving wireless links formed on specific frequency bands.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

The techniques of this disclosure involve dynamically switching between frequency bands as a result of a detected condition that has the potential to degrade performance on the current band of operation. An access point having the capability to operate on multiple bands advertises this capability to stations, either during the association process or after association. The access point also provides any information necessary to form a communication link on a different band of operation, such as the channel of operation and any security credentials. Accordingly, a device that is associated with the access point on one frequency band may first receive the band switching information. Subsequently, when the device detects a condition that may degrade performance on the first frequency band, it may dynamically switch to a different band of operation using the band switching information. In one embodiment, the band switch may be unilaterally determined by the one of the devices.

For example, the device may detect when a collocated Bluetooth transceiver is operating and dynamically switch from operation on the 2.4 GHz band to the 5 GHz band to prevent interference with the Bluetooth communications. Since the device has already received the information necessary to form the link on the 5 GHz band, delay in switching to that band is substantially reduced. In other embodiments, the device may switch from a first band of operation to a second band of operation using association information received on the first band in response to any suitable trigger.

Figure 1:
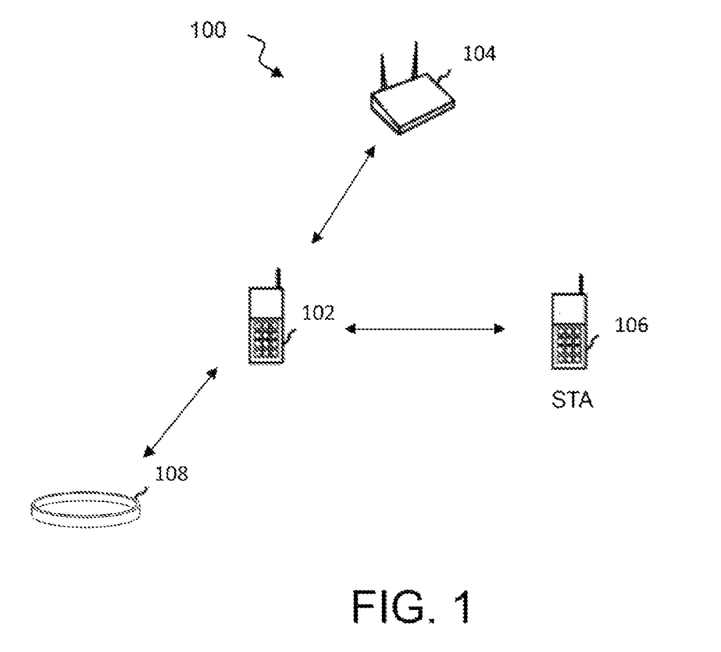
FIG. 1 schematically depicts a wireless environment including wireless communications devices capable of operating on a plurality of frequency bands, according to one embodiment.

Aspects of the present disclosure may be exemplified in the context of the wireless environment 100 depicted in FIG. 1. As shown, wireless communications device (WCD) 102, acting in the role of a STA, may be within sufficient range to form a communications link with AP 104. According to the techniques of this disclosure, both wireless communications device 102 and AP 104 are capable of concurrently operating on a plurality of frequency bands through the use of independent transceivers, such as on the 2.4 GHz band to the 5 GHz band. Wireless communications device 102 may also be able to form a direct communications link with another wireless communications device also acting in the role of a STA, such as STA 106, using any suitable ad hoc or peer-to-peer protocol. For example, wireless communications device 102 may employ SAP techniques, may operate as a P2P GO, or may provide other equivalent functionality. In this context, STA 106 is also capable of concurrent operation on at least two separate frequency bands that are supported by wireless communications device 102.

Still further, wireless communications device 102 may also employ additional wireless protocols or radio access technologies (RATs). For example, shorter range communications, which may be characterized as a personal area network (PAN), may be provided using a BLUETOOTH® (Bluetooth) protocol to connect and exchange information between mobile phones, computers, wearables, digital cameras, wireless headsets, speakers, keyboards, mice or other input peripherals, and similar devices. As shown, wireless communications device 102 may form a Bluetooth communications link with wrist band 108, which may function as a watch, notification device, fitness tracker, or may provide other similar services. In other embodiments, wireless communications device 102 may feature any number of suitable RATs, including, without limitation, code division multiple access (CDMA), time division synchronous code division multiple Access (TD-SCDMA), high speed packet access (HSPA(+)), high-speed downlink packet access (HSDPA), global system for mobile communications (GSM), enhanced data GSM environment (EDGE), WiMax®, ZigBee®, wireless universal serial bus (USB), and the like.

Figure 2:
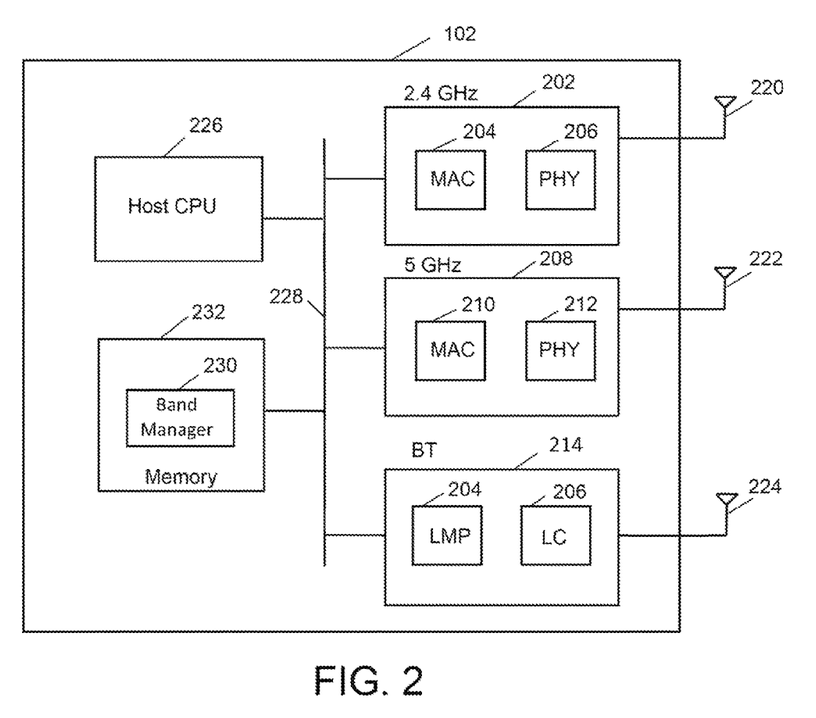
FIG. 2 schematically depicts functional blocks of a wireless communications device configured for dynamic band switching, according to one embodiment.

Additional details regarding one embodiment of wireless communications device 102 are depicted as high level schematic blocks in FIG. 2. Devices acting in other network roles, such as an access point, P2P client or the like, may be similarly configured. Generally, wireless communications device 102 may employ an architecture in which the lower levels of the WLAN protocol stack are implemented in firmware and hardware of WLAN transceiver 202. As shown, 2.4 GHz transceiver 202 includes media access controller (MAC) 204 that performs functions related to the handling and processing of 802.11 frames of data including verification, acknowledgment, routing, formatting and the like. Incoming and outgoing frames are exchanged between MAC 204 and physical layer (PHY) 206, which as shown includes the functions of modulating the frames according to the relevant 802.11 protocol as well as providing the analog processing and RF conversion necessary to provide transmission and reception of wireless signals. Further, wireless communications device 102 may also include 5 GHz transceiver 208 having MAC 210 and PHY 212. As discussed above, wireless communications device 102 may also be able to form communication links using other RATs. In this embodiment, wireless communications device 102 may include Bluetooth module 214, having a link manager (LM) 216 for managing the Bluetooth RF link as well as link controller (LC) 218 for performing hardware-specific transmission and reception of electronic signals, and may be coupled to an antenna 224.

As shown, 2.4 GHz transceiver 202, 5 GHz transceiver 208 and Bluetooth module 214 are each coupled to separate antennas 220, 222 and 224, respectively. However, as desired and depending upon the wireless protocols employed, one or more antennas may be shared between the transceivers using switching techniques known in the art. Likewise, some or all elements of the respective transceivers may be collocated on a common system, (e.g., on the same circuit board or on distinct circuit boards within the same system, or may be embedded on the same integrated circuit as in a system on a chip (SoC) implementation).

Wireless communications device 102 also includes host CPU 226 configured to perform the various computations and operations involved with the functioning of wireless communications device 102. Host CPU 226 is coupled to 2.4 GHz transceiver 202, 5 GHz transceiver 208 and Bluetooth module 214 through bus 228, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. As shown, wireless communications device 102 may include band manager 230 implemented as processor-readable instructions stored in memory 232 that may be executed by CPU 226 to coordinate operation of 2.4 GHz transceiver 202, 5 GHz transceiver 208 and Bluetooth module 214 according to the techniques of this disclosure. One of ordinary skill in the art will recognize that the functionality of band manager 230 may be implemented using any desired combination of hardware, firmware and/or software, in any suitable architecture.

As described below, band manager 230 may be configured to perform different operations depending upon the role of wireless communications device 102 within the WLAN. Generally, formation of a wireless communications link may involve a node acting as the initiator and a node acting as the responder. The initiator requests the formation of the wireless communications link while the responder either accepts or denies the request.

When acting in the role of AP or peer, wireless communications device 102 may respond to an initiator's request to form a communications link. Correspondingly, band manager 230 may monitor one transceiver, such as 2.4 GHz transceiver 202 for newly-formed communications link with another wireless communications device. Either during the association process or subsequently, band manager 230 may then transmit alternate band information regarding another transceiver, such as 5 GHz transceiver 208. Consequently, the other wireless communications device may use the alternate band information to dynamically switch operation from communication using the 2.4 GHz band to communication using the 5 GHz band. In one aspect, the other wireless communications device may unilaterally determine when to switch bands, without requiring involvement or communication exchanges using 2.4 GHz transceiver 202.

Figure 3:
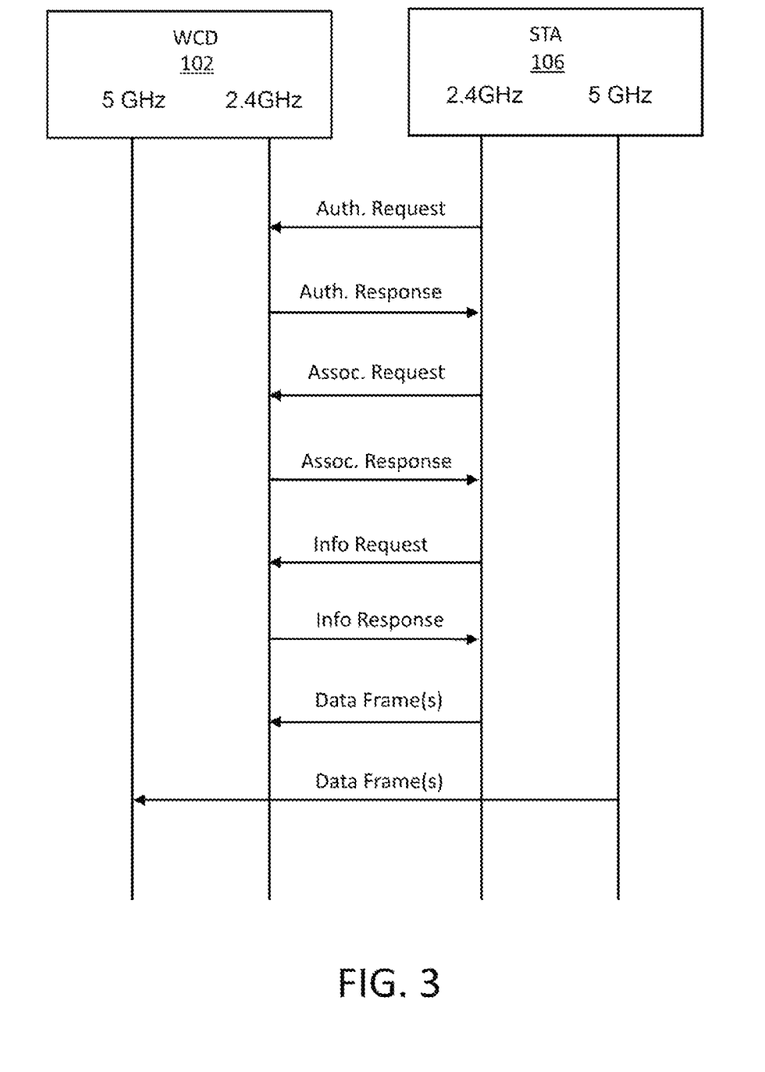
FIG. 3 is a sequence diagram showing coordination between wireless communications devices to transmit alternate band information, according to one embodiment.

To help illustrate aspects of these embodiments, FIG. 3 depicts a sequence diagram showing the exchange of messages between wireless communications device 102 and STA 106 in a peer-to-peer communications link. A similar exchange may occur when wireless communications device 102 is acting in the role of SAP. STA 106 initiates a first handshake by sending an authentication request. Generally, STA 106 may send the authentication request using the SSID associated with one of the transceivers of wireless communications device 102, 2.4 GHz transceiver 202 in this example. STA 106 may obtain the SSID as per the relevant 802.11 protocols, such as from a beacon frame sent by wireless communications device 102 or from a probe request and probe response exchange. Wireless communications device 102 may then reply with an authentication response frame to validate the respective identities. The authentication exchange may also be used to establish the use of a suitable encryption scheme, such as Wi-Fi Protected Access II (WPA2), Wi-Fi Protected Access (WPA), Wired-equivalent Privacy (WEP), or the like. Following authentication, a second handshake is performed in which STA 106 sends an association request frame and wireless communications device may reply with an association response frame as shown. The association exchange may result in an allocation of network resources by wireless communications device 102 and the formation of an active link. Thus, substantial overhead in the form of the above handshake exchanges occurs during the initial formation of the wireless communications link.

Wireless communications device 102 may then send alternate band information to STA 106. As shown, this may constitute a dedicated signal "Info Request" sent in response to specific request "Info Request" from STA 106. Alternatively, wireless communications device 102 may automatically transmit the alternate band information. This may be achieved with a dedicated frame or some or all of the alternate band information may be incorporated into a frame that has already been exchanged, such as the association response or authentication response frames. The alternate band information may include any details needed to associate with wireless communications device 102 using a different transceiver, such as 5 GHz transceiver 208. This may include the SSID, MAC address of the 5 GHz transceiver, channel of operation, time stamps, supported rates, signal strength for rate selection, connection parameters, security type, security code, as well as any other information needed to successfully transmit a frame from STA 106 to wireless communications device 102 on the 5 GHz band. In one aspect, the alternate band information removes the necessity of performing the authentication or association handshakes described above when switching from one frequency band to the other. Further, band manager 230 may update the alternate band information as warranted by operation of 5 GHz transceiver 208 and resend the alternate band information when updated, periodically or in response to a request from STA 106.

Correspondingly, STA 106 may dynamically switch operation from the 2.4 GHz band to the 5 GHz band. As indicated, STA 106 may initially communicate by sending one or more data frames to wireless communications device 102 using the 2.4 GHz band. Upon determination of any suitable criteria, STA 106 may directly switch to employing the 5 GHz band to send one or more data frames. As will be appreciated, this does not invoke the overhead involved with a conventional association process.

When acting in the role of STA or peer, wireless communications device 102 may be the initiator for a communications link. After formation of the link using one transceiver, such as 2.4 GHz transceiver 202, band manager 230 may receive alternate band information regarding operation on another frequency band, such as with 5 GHz transceiver 208. As such, band manager 230 may use the alternate band information to allow wireless communications device 102 to dynamically switch operation from communication using the 2.4 GHz band to communication using the 5 GHz band. In one aspect, wireless communications device 102 may unilaterally determine when to switch bands, without requiring involvement or communication of the transceiver that was initially used to form the communications link.

Figure 4:
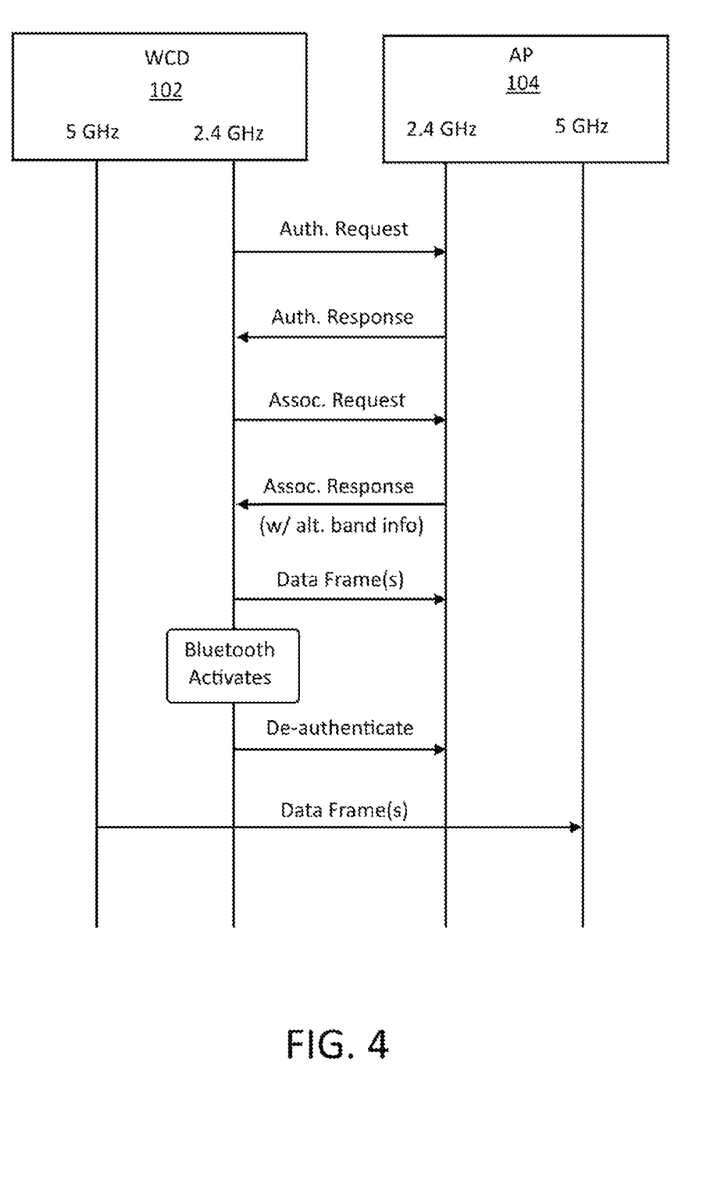
FIG. 4 is a sequence diagram showing coordination between wireless communications devices to receive alternate band information, according to one embodiment.

As another example, FIG. 4 depicts a sequence diagram showing the exchange of messages between wireless communications device 102 and AP 104 in an infrastructure topology. A similar exchange may occur when wireless communications device 102 is acting in the role of a peer initiating a request for a wireless communications link. Here wireless communications device 102 initiates the first handshake by sending an authentication request management frame. AP 104 may then reply with an authentication response frame to validate the respective identities and establish any security protocol. Following authentication, wireless communications device 102 conducts the second handshake by sending an association request management frame and AP 104 may reply with an association response management frame as shown. In this example, AP 104 incorporates the alternate band information into the association response, although as described above, the information may also be sent in a dedicated frame.

Upon receipt of the alternate band information, wireless communications device 102 may dynamically switch operation from the 2.4 GHz band to the 5 GHz band. In a similar manner to the above embodiment, wireless communications device 102 may initially communicate by sending one or more data frames to AP 104 using the 2.4 GHz band. Upon determination of any suitable criteria, wireless communications device 102 may directly switch bands. For example, Bluetooth module 214 may become active as indicated. Consequently, band manager 230 may switch operation from 2.4 GHz transceiver 202 to 5 GHz transceiver 208. In one aspect, a deauthentication frame may be sent on the 2.4 GHz band prior to the switch as shown. This may contain an explicit indication that operation is switching to the 5 GHz band or the switch may be implicit. Alternatively, band manager 230 may directly switch to employing the 5 GHz band to send one or more data frames without additional exchanges with AP 104.

As noted, any defined criterion may be employed when determining to switch operation from one frequency band to another. In one aspect, this may include operations being performed by the device performing the switch. For example, wireless communications device 102 includes Bluetooth module 214 as describe above. Since Bluetooth communications may cause interference on the 2.4 GHz band, band manager 230 may monitor the operational status of Bluetooth module 214. If Bluetooth module 214 is active, or if activity is impending, band manager 230 may switch operation from 2.4 GHz transceiver 202 to 5 GHz transceiver 208. As another example, the alternate transceiver may be associated with higher performance. As such, band manager 230 may switch frequency bands upon determining a higher quality of service (QoS) is desired. In another aspect, a suitable criterion may be link quality, which may be assessed in any suitable manner, including signal strength (e.g., a received signal strength indication (RSSI)), congestion, throughput and the like. Thus, band manager 230 may institute a switch from operation on a first frequency band to a second frequency band upon detection of any condition that may degrade performance with respect to the first frequency band. In one aspect, band manager 230 may send a request for alternate band information after detection of the defined criterion before switching operation.

Figure 5:
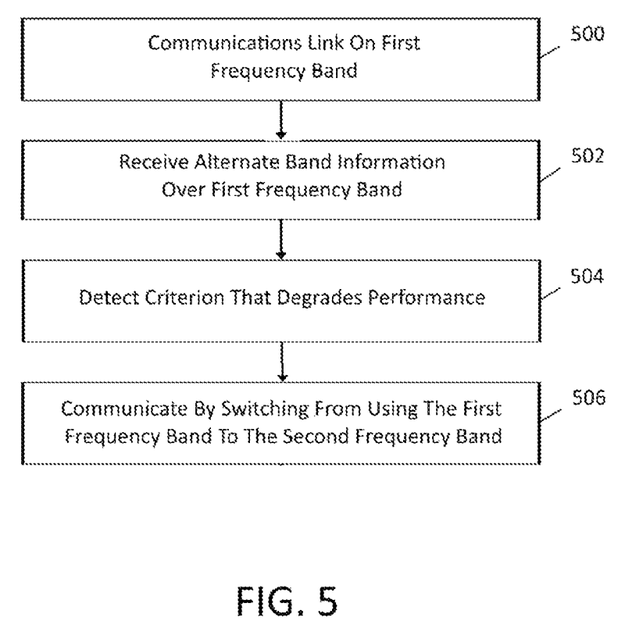
FIG. 5 is a flowchart showing an exemplary routine for dynamic band switching, according to one embodiment.

To help illustrate the techniques of this disclosure with regard to performing a dynamic band switch, an exemplary routine is represented by the flowchart of FIG. 5. Beginning with 500, a first wireless communications device may form a communications link over a first frequency band with a second wireless communications device. In 502, the first wireless communications device receives alternate band information sent by the second wireless communications device over the first frequency band. The first wireless communications device may detect a defined condition that may degrade performance on the first frequency band in 504. Upon detection, the first wireless communications device then communicates in 506 with the second wireless communications device by switching from using the first frequency band to using the second frequency band.

In another aspect, band manager 230 may be configured to intelligently select between frequency bands during an initial association. For example, if Bluetooth module 214 is active when wireless communications device 102 discovers AP 104, band manager 230 may form the association with 5 GHz transceiver 208 rather than 2.4 GHz transceiver 202. In this example, AP 104 may employ the same SSID for both bands.

Although described in the context of wireless communications device 102 switching from the 2.4 GHz band to the 5 GHz band, any suitable number of frequency bands may be employed. For example, depending upon the 802.11 standard being employed, the wireless communications may be carried on one or more frequency bands. For example, 802.11b/g/n networks may use a 2.4 GHz frequency band, 802.11a/n/ac networks may use a 5 GHz frequency band, 802.11j networks may use a 4.9 GHz frequency band, 802.11 ad networks may use a 60 GHz band and legacy 802.11 networks may use a 900 MHz band. The dynamic switch may be between any of these or other frequency bands.

Described herein are presently preferred embodiments. However, one skilled in the art that pertains to the present invention will understand that the principles of this disclosure can be extended easily with appropriate modifications to other applications.

What is claimed is:

1. A wireless communications device, comprising:
a first transceiver configured to communicate with a first network node over a first frequency band;
a second transceiver configured to communicate with the first network node over a second frequency band;
a third transceiver configured to operate in accordance with a Bluetooth protocol; and
a band manager configured to:
establish a communications link with the first network node on the first frequency hand;
process alternate band information, wherein the alternate band information is communicated using the first transceiver and includes association information exchanged with the first network node during an association handshake used in establishing the communications link; and
use the alternate band information to dynamically switch communication with the first network node from the first frequency band to the second frequency band without performing another association handshake with the first network node, wherein the dynamically switching is based at least in part on an operational status of the third transceiver being active.

2. The wireless communications device of dairy 1, wherein the band manager is configured to process alternate band information by transmitting the alternate hand information to the first network node.

3. The wireless communications device of claim 1, wherein the band manager is configured to process alternate band information by receiving the alternate band information from the first network node.

4. The wireless communications device of claim 1, wherein the first frequency band is a 2.4 GHz band and wherein the second frequency band is a 5 GHz band.

5. A method for communication with a wireless communication device, the method comprising:
establishing a communications link with the wireless communication device on a first frequency band;
processing alternate band information, wherein the alternate band information is communicated over the first frequency band and includes association information exchanged with the wireless communication device during an association handshake used in establishing the communications link; and
using the alternate band information to dynamically switch communication with the wireless communication device from the first frequency band to a second frequency band without performing another association handshake with the wireless communication device, wherein the dynamically switching is based at least in part on an operational status of a transceiver of the wireless communications device configured to operate in accordance with a Bluetooth protocol being active.

6. The method of claim 5, wherein processing alternate band information comprises transmitting the alternate hand information to the wireless communication device.

7. The method of claim 5, wherein processing alternate band information comprises receiving the alternate band information from the wireless communication device.

8. The method of claim 5, wherein the first frequency band is a 2.4 GHz band and wherein the second frequency band is a 5 GHz hand.

9. A non-transitory processor-readable storage medium storing instructions that, when executed by one or more processors of a wireless communications device having a first transceiver configured to communicate with a first network node over a first frequency band and a second transceiver configured to communicate with the first network node over a second frequency band, causes the wireless communications device to:
establish a communications link with the first network node on the first frequency band;
process alternate band information, wherein the alternate band information is communicated using the first transceiver and includes association information exchanged with the first network node during an association handshake used in establishing the communications link; and
use the alternate band information to dynamically switch communication with the first network node from the first frequency band to the second frequency band without performing another association handshake with the first network node, wherein the dynamically switching is based at least in part on an operational status of a third transceiver of the wireless communications device configured to operate in accordance with a Bluetooth protocol being active.

10. The storage medium of claim 9, wherein execution of the instructions to process the alternate band information causes the wireless communications device to transmit the alternate band information to the first network node.

11. The storage medium of claim 9, wherein execution of the instructions to process the alternate band information causes the wireless communications device to receive the alternate band information from the first network node.

* * * * *